May 14, 1968  D. M. MONTANA ETAL  3,383,685
RADAR SYSTEM

Filed Dec. 30, 1966      2 Sheets-Sheet 1

INVENTORS.
DONALD M. MONTANA,
FRANK ANTONIK &
FRANK C. LISLE

Harry A. Herbert Jr
Julius L. Siegel
ATTORNEYS

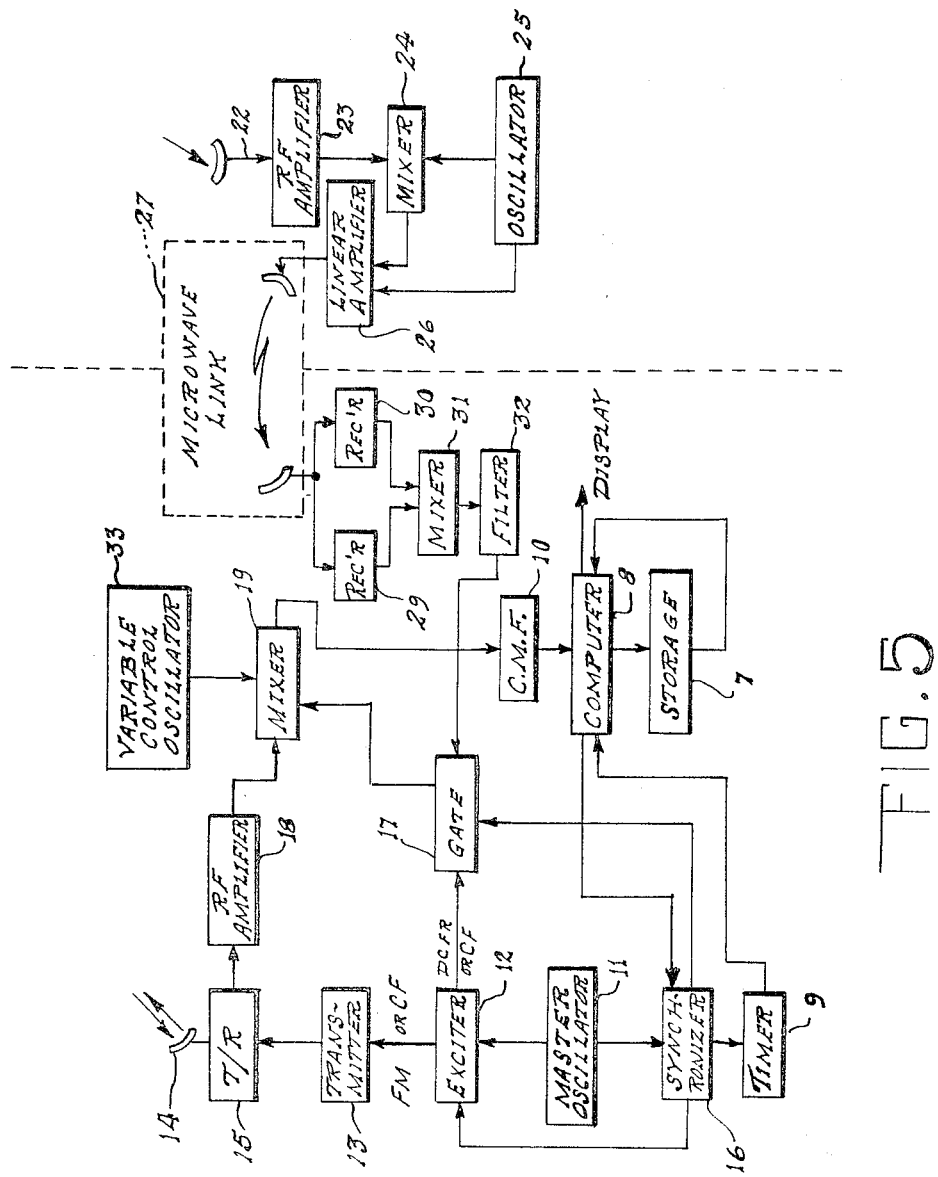

3,383,685
RADAR SYSTEM

Donald M. Montana, Utica, Frank C. Lisle, Syracuse, and Frank Antonik, Marcy, N.Y., assignors to the United States of America as represented by the Secretary of the Air Force
Continuation-in-part of application Ser. No. 464,884, June 17, 1965. This application Dec. 30, 1966, Ser. No. 607,134
4 Claims. (Cl. 343—14)

ABSTRACT OF THE DISCLOSURE

A radar system with two receiving sites. The transmitter can transmit either FM pulses, CF pulses, delayed FM or CF pulses. The echo signal from the remote site is transferred to the transmitting site for heterodyning in a time shared mixer and then followed by a system of spectrum analysis.

---

This is a continuation-in-part of co-pending application, Ser. No. 464,884, filed June 17, 1965, now abandoned.

The invention described herein may be manufactured and used by or for the United States Government for governmental purposes without payment to us of any royalty thereon.

This invention relates to radar, and more particularly, to a system for determining the position of a target using the principle of heterodyning.

The invention is a new concept in baseline radar or an active swept frequency interferometer type radar. It is a multistatic baseline radar which performs a correlation of the signals received in the frequency domain. The method of frequency correlation is a heterodyning process and therefore the measured target intelligence is an observed frequency difference. The mode of transmission and the method of processing employed determines a particular parameter of target position or motion to be measured.

The present invention has the advantage that the normal ambiguity pattern does not exist at any particular instant in time. In this respect the invention departs from the conventional phase interferometer which is plagued with a geometric angle ambiguity occurring every 180° in phase angle. The conventional phase interferometer is limited in accuracy by the phase stability of the components which precede the generation of the interference pattern.

The measurable parameters are range, range rate, azimuth, azimuth rate, elevation and elevation rate. The two modes of transmission are pulsed linear frequency modulation and pulsed continuous frequency. Received signals may be processed either monostatically at a centrally located transmitter and receiver site or bistatically at remote apertures separated by a given baseline distance. The measured parameters are related to the transmission mode and method of reception as follows: Range is determined by using a pulsed FM transmission mode and is received monostatically; range rate is determined by using a pulsed CF transmission mode and is received monostatically; angle is determined by using a pulsed FM transmission mode and is received bistatically; and angle rate is determined by using a pulsed CF mode and is received bistatically.

The frequency measurement medium is a coherent memory filter, such as described in U.S. Patent No. 3,013,209, issued to Bickel and Bernstein on Dec. 12, 1961, which analyzes the spectrum of the frequency difference terms obtained in the mixing of the signals received.

The invention embodies normal techniques in radar of baseline configuration yielding geometric angle measurement essentially independent of the physical antenna apertures employed. The aperture of the composite is dimensionally equivalent to the baseline separation and enjoys an equivalent angle measurement, accuracy, and resolution.

An object of the invention is therefore to provide a radar system yielding geometric angle measurement essentially independent of the physical antenna apertures employed.

It is another object to provide a radar system for determining the geometric angle which is without the ambiguity occurring every 180 degrees in phase angle.

The above and still other objects, advantages, and features of our invention will become apparent upon consideration of the following detailed description of one embodiment thereof, especially when taken in conjunction with the accompanying drawings, in which FIG. 1 is a diagram showing the difference in range paths from a target to two ground stations;

FIG. 5 is a block diagram of an embodiment of the invention.

Figure 1:
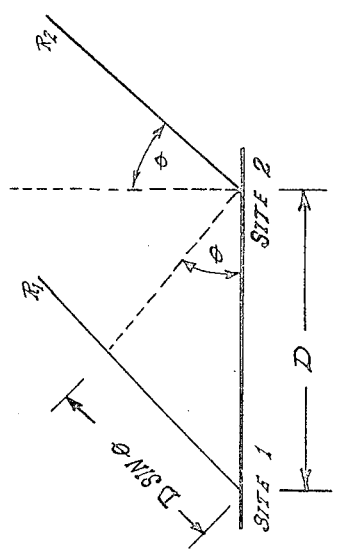

Referring to FIGURE 1 for determining geometric angle, two receivers at sites 1 and 2 are separated by distance D. The distance to the target is assumed very large compared to D so that the assumption of parallel rays holds. The angle of the reflected energy with the normal to the baseline is $\theta$. The phase front of the reflected energy is therefore related to $\theta$ such that the range difference can be approximated as $D \sin \theta$.

Figure 2:
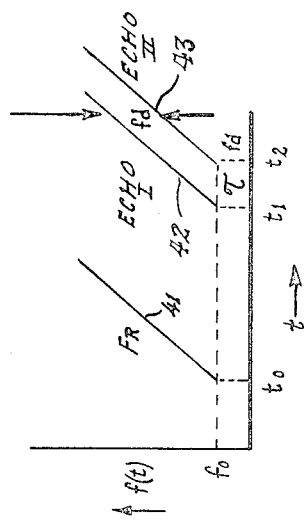
FIG. 2 shows the time-frequency relationship of the transmitted frequency ramp and the echoes received from a single target at two sites.

Referring to FIGURE 2, the transmitted signal on the frequency ramp, FR at 41, starts with initial frequency, $f_0$, and at time $t_0$ and can be expressed as $$f_T(t) = f_0 + a(t - t_0) \quad (1)$$

where $t$ is the time variable and $a$ is the slope of the frequency ramp. Reflected signal 42 received at Site 1 can then be written $$f_{R1}(t) = f_0 + a(t - t_1) \quad (2)$$

and reflected signal 43 received at Site 2 is:

$$f_{R2}(t) = f_0 + a(t - t_2) \quad (3)$$

where $t_1$ and $t_2$ are the times of arrival of the received signals at Sites 1 and 2, respectively.

The signals from the two sites are then heterodyned together. The difference frequency extracted is:

$$f_d(t) = f_{R1}(t) - f_{R2}(t) = a(t_2 - t_1) = a\tau \quad (4)$$

where $\tau = t_2 - t_1$ or the difference in the time of arrival of the echoes at Sites 1 and 2.

Referring again to FIGURE 1, the time analog of the frequency difference can be related to the geometric angle:

$$D \sin \theta = c\tau \quad (5)$$

Substituting an expression for $\tau$ from Equation 4, Equation 5 can be rewritten $$D \sin \theta = c\left(\frac{f_d(t)}{a}\right) \quad (6)$$

or $$\theta = \text{Arc sin}\left(\frac{c \cdot f_d(t)}{a \cdot D}\right) \quad (7)$$

Equation 7 can be rewritten to provide the following expression for the measured frequency difference:

$$f_d(t) = \frac{Da \sin \theta}{c} \quad (8)$$

Employing the prior assumption for a stationary target no change in geometric angle will occur and hence $f_d(t)$ will be a constant single valued function of the geometric angle. The frequency difference is therefore uniquely determined by $\theta$ throughout the range of the geometric angle from 0° to 90°.

The accuracy to which frequency can be measured will determine the accuracy of measured angle data, neglecting all other sources of error. The angular sensitivity may be found by taking the rate of change of the difference frequency with respect to angle, or $$\frac{\partial f_d(t)}{\partial \theta} = \frac{aD \cos \theta}{c} \quad (9)$$

This sensitivity is shown to be directly proportional to the slope of the transmitted ramp and the length of the baseline. The angle of maximum sensitivity is shown to be at 0°.

Figure 3:
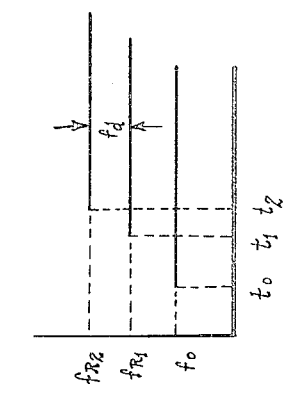
FIG. 3 shows the heterodyning principle used to obtain a difference frequency from two echoes resulting from a transmitted CF pulse.

For determination of angle rate a pulsed constant frequency mode of transmission is employed in conjunction with the interferometer configuration as illustrated in FIGURES 1 and 3.

The range difference $R_1 - R_2$ is related to the geometric angle described in FIGURE 1 as follows:

$$D \sin \theta = R_1 - R_2 \quad (10)$$

Taking the time derivative of both sides:

$$D \cos \theta \cdot \dot{\theta} = \dot{R}_1 - \dot{R}_2 \quad (11)$$

The echo frequency received at Site 1 is the transmitted frequency, $f_0$ modified by Doppler, or $$f_{R_1} = f_0 \left( \frac{c + v_1}{c - v_1} \right) \quad (12)$$

where $v_1$ is the radial velocity component, the rate of change of range, toward Site 1. At Site 2 the received frequency is $$f_{R_2} = f_0 \left( \frac{c + v_1}{c - v_2} \right) \quad (13)$$

where $v_1$ and $v_2$ are the radial velocity components toward Sites 1 and 2 respectively. The Doppler frequency shifts are relative to the particular sites. In this case, Equation 13, the signal is transmitted from Site 1 and received at Site 2. Heterodyning the 2 echoes and taking the difference term $$f_d = f_0 \left( \frac{c + v_1}{c - v_1} \right) - f_0 \left( \frac{c + v_1}{c - v_2} \right)$$

results. The frequency difference term can be rewritten:

$$f_d = f_0 \left[ \frac{c(v_1 - v_2)}{(c - v_1)(c - v_2)} \right] - f_0 \left[ \frac{v_1 v_2}{(c - v_1)(c - v_2)} \right] + f_0 \left[ \frac{v_1^2}{(c - v_1)(c - v_2)} \right] \quad (14)$$

The last two terms are small and can be dropped with negligible error.

Assuming $(c - v_1)(c - v_2) = c^2$ the difference frequency may be reduced to $$f_d \simeq f_0 \left( \frac{v_1 - v_2}{c} \right) = \frac{\dot{R}_1 - \dot{R}_2}{\lambda} \quad (15)$$

where $\lambda$ is the wavelength of the carrier signal.

Combining Equations 11 and 15 the frequency difference is related to the angle rate as folows:

$$f_d = \frac{D \cos \theta \cdot \dot{\theta}}{\lambda} \quad (16)$$

or $$\dot{\theta} = \frac{\lambda}{D \cos \theta} (f_d) \quad (17)$$

The variable $\theta$ is to be supplied as the measured parameter described in Equation 7. The frequency difference term will then uniquely describe the time rate of change of the geometric angle. Again it is shown that the angle rate accuracy will depend directly on the accuracy of measuring $f_d$.

Figure 4:
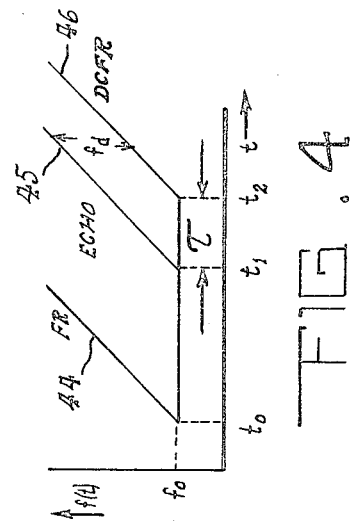
FIG. 4 is a graph showing the relationship of frequency and time using an FM pulse for determining range.

Referring to FIG. 4 for determination of range, the linear frequency deviation or FR shown as 44 is used in the monostatic mode.

Echo pulse 45 received at time $t_1$ will initiate at time $t_2$ the generation of a FR coherently delayed in time, called the delayed coherent frequency ramp or DCFR at 46. Received echo 45 is heterodyned with the DCFR yielding a frequency difference $f_d$. The mixing circuits the the same as used in angle determination. The measured quantity is the frequency analog of the time difference in that $f_d = a\tau$. The range to the target is the product of the velocity of light and the one way propagation time delay or $$R = (t_1 - t_0) \frac{c}{2} \quad (18)$$

Since the occurrence of $t_0$ and $t_2$ can be discretely established by the internal radar timing system, an expression of range is desired in terms of $t_0$ and $t_2$. Since $$t_1 = t_2 - \tau = t_2 - \frac{f_d}{a} \quad (19)$$

Equation 18 can be rewritten:

$$R = t_2 - t_0 - \frac{f_d}{a} \frac{c}{2} \quad (20)$$

As an example, the radar PRF (and hence $t_0$) can be derived from a stable oscillator (clock) at 10 megacycles per second. Discrete clock pulses can be selected to establish the start of the FR at $t_0$ and the start of the DCFR at $t_2$. A cycle count during the interval $t_2 - t_0$ can be made providing a portion of the range measurement in an essentially noise free environment. The remainder of the range measurement is made in the frequency domain. It should be noted that range is measured entirely independent of the amplitude envelope of the received echo. That is, the degradation in the leading edge of the return pulse will have no effect in this method of range measurement.

Range rate is measured monostatically employing the pulsed continuous frequency mode of transmission. This measurement is the convention Doppler method of determining range-rate. The instantaneous transmitted signal is $$f_i = f_0 \quad (21)$$

The received echo is modified by Doppler such that $$f_{R_i} = f_0 \left( \frac{c + v_R}{c - v_R} \right) \quad (22)$$

for a target approaching the radar station. Heterodyning and extracting the difference frequency yields:

$$f_d = f_0 \left( \frac{c + v_R}{c - v_R} \right) - f_0 = f_0 \left( \frac{2v_R}{c - v_R} \right) \quad (23)$$

The quantity $(c - v_R)$ can be approximated for practical purposes by $c$.

Then $$f_d = f_0 \left( \frac{2v_R}{c} \right) = \frac{2\dot{R}}{\lambda} \quad (24)$$

or $$\dot{R} = \frac{f_d \cdot \lambda}{2} \quad (25)$$

In the determination of angle, above, the stationary target assumption was made to simplify the mathematical model only to illustrate how angle intelligence is obtained. It is now appropriate to observe the effects of Doppler on the signals received bistatically when the ramp mode is employed. The signal received at Site 1 now becomes:

$$f_{R_1}(t) = [f_0 + a(t-t_1)] \left[\frac{c+v_1}{c-v_1}\right] \quad (26)$$

Similarly at Site 2 the received signal is $$f_{R_2}(t) = [f_0 + a(t-t_2)] \left[\frac{c+v_1}{c-v_2}\right] \quad (27)$$

The times of arrival $t_1$ and $t_2$ and the radial velocity components $v_1$ and $v_2$ apply to Sites 1 and 2 respectively.

Heterodyning the target echoes received at Sites 1 and 2 and extracting the frequency difference yields:

$$f_d(t) = f_{R_1}(t) - f_{R_2}(t) \quad (28)$$

Regrouping the like terms of Equation 28 provides identification of the source of the frequencies present.

$$f_d(t) = f_0\left(\frac{c+v_1}{c-v_1} - \frac{c+v_1}{c-v_2}\right) + at\left[\frac{c+v_1}{c-v_1} - \frac{c+v_1}{c-v_2}\right] + a\left[t_2\left(\frac{c+v_1}{c-v_2}\right) - t_1\left(\frac{c+v_1}{c-v_1}\right)\right] \quad (29)$$

The first term on the right hand side of the equation can be recognized as the Doppler difference on the carrier and was obtained directly and undiluted in the measurement of angle rate. This term can either be heterodyned out in real time or programmed out in non-real time data processing.

The second term is the Doppler difference on the slope of the frequency ramp and could either be neglected or negated through a frequency track process depending upon the accuracy goal and the parameters of the system. Equation 29 can therefore be approximated very closely by the third term which will now be expanded. As before, the expression $\tau = t_2 - t_1$ is employed to obtain a frequency analog of the time difference. Substituting for $t_2$ in Equation 29 and dropping the first two terms discussed above yields:

$$f_d(t) = a\tau\left(\frac{c+v_1}{c-v_2}\right) + \frac{at_1c(v_2-v_1)}{(c-v_1)(c-v_2)} - \frac{at_1v_1^2}{(c-v_1)(c-v_2)} + \frac{at_1v_1v_2}{(c-v_1)(c-v_2)} \quad (30)$$

The first right hand term of Equation 30 represents the desired angle intelligence slightly corrupted by Doppler. The other terms may be neglected as they contribute very little to the processed frequency spectrum.

In the foregoing mathematical model, the parameters were measured primarily in the frequency domain. The coherent memory filter (CMF) mentioned above will perform this function. That is, the CMF coherently integrates the received signal for a predetermined period of time and provides a direct readout of the power spectrum of all frequencies contained in the received signal. The CMF to be employed in one model of the invention will integrate for ⅙ of a second and is time shared such that sequential periods of processing time will be used for each measured parameter. Necessary interface circuits can be provided to program the time sharing and data readout functions.

The echo from the remote site is relayed back to the master site via a special purpose wide band microwave relay link. An initial calibration feature can be provided to measure in the frequency domain the propagation delay through the relay system and provide the necessary compensation through the control of a variable crystal oscillator.

Referring now to FIGURE 5, master oscillator 11 is provided at the master or transmitting site to generate the clock pulses from which the system timing waveforms, the FR and DCFR, are initiated. Exciter 12 supplies both the linear frequency ramp (FR) and the pulsed constant frequency (CF) at low level to the driver section of wide band transmitter 13. The signal is then fed to the final power amplifier which in turn feeds the high level transmission signal to antenna feed system 14 through T/R box or duplexer 15. Synchronizer 16 determines by preprogramming or command, the mode of transmission and selects the proper LO signal (DCFR or CF) to be used in the monostatic heterodyning process. Similarly the waveform generator also controls the operation of gating circuits 17 to select the desired mode of signal processing (bistatic or monostatic). A separate processing loop (heterodyner, CMF and interface circuits) can be provided for monostatic and bistatic operation thus eliminating the above described time sharing process.

The receiver section of the master or transmitting site consists of a low noise parametric amplifier 18, mixer 19, and IF amplifiers having linear phase and frequency characteristics. A system of band pass filters and gates can be employed in the pre-CMF circuits to provide the desired frequency for spectrum analysis which is performed by coherent memory filter 10. Computer 8, fed by coherent memory filter 10, is provided for computation following which the measured target parameters are displayed or recorded. Timer 9, fed by synchronizer 16, keep a continuous record of events and time differences necessary for calculation. Time marks can be recorded to permit non-real time data reduction by computer 8. Information from computer 8 is fed to storage 7 or subsequent calculation, such as storing angle data for obtaining angle rate.

At the remote site, the target echo is received by antenna 22 and is amplified by amplifier 23 (low noise parametric and TWT amplifier chain). The received signal is heterodyned upward to X band by mixer 24 and oscillator 25 and further amplified by amplifier 26 to a power output suitable for transmission over a wide band microwave link 27 to the master or transmitting site. Both the heterodyned signal and the oscillator signal so employed are received at the master site by receivers 29 and 30 tuned to separate frequencies. Upon reception at the master site these two signals are re-heterodyned by mixer 31 and the difference frequency which results is an exact replica of the target echo received at the remote site. This signal is then filtered by filter 32 and directed through gating circuits 17 (when so controlled for bistatic operation) and heterodyned with the target echo received directly by the master site. The difference frequency is corrected by the off-set of variable control oscillator 33 to compensate for the delay of the microwave link. The delay may vary depending upon atmospheric conditions. The corrected difference frequency is then processed by the pre-CMF circuits as described above for monostatic operation. A second mixer can be added to mixer 19 or, as shown, a single mixer is used and is time shared being controlled by gate 17.

What is claimed is:

1. A radar system for determining the angle of a target comprising:
    (a) means for producing an FM pulse having a given frequency ramp;
    (b) means for transmitting the FM pulse;
    (c) means for receiving the echo from the FM pulse at the transmitting site and at a remote site, the sites being separated by a known distance;
    (d) a remote site local oscillator;
    (e) a remote site mixer for heterodyning the received echo from the FM pulse with the signal from the remote site local oscillator;
    (f) a microwave link for transferring the heterodyne signal at the remote site and the signal from the remote site local oscillator to the master site;
    (g) means for re-heterodyning the transferred heterodyned signal and the signal from the remote site local oscillator for obtaining the original frequency of the received FM pulse as received at the remote site;

(h) a transmitting site mixer for heterodyning the FM pulse received at the transmitting site and the re-heterodyned transferred signal to produce a signal having a difference frequency; and (i) means for computing the angle of the target based on the difference frequency and the distance between the sites.

2. A radar system for transmitting and receiving alternate CF pulses or FM pulses and having an alternate remote receiving station, the system comprising:

(a) a master oscillator;

(b) an exciter fed by the master oscillator for generating FM pulses, CF pulses, delayed FM pulses, and delayed CF pulses;

(c) a synchronizer fed by the master oscillator for controlling the exciter;

(d) means for transmitting the pulses;

(e) means for receiving echo signals at the transmitting station;

(f) means for receiving echo signals at the remote station;

(g) means for transferring the echo signal from the remote station to the transmitting station;

(h) a first mixer at the transmitting station selectively fed by the exciter, the transmitting station receiving means, and the transferred echo signal from the remote station;

(i) means for gating the input to the first mixer from the exciter and from the remote station of the gating means being controlled by the synchronizer; and (j) means for determining the difference frequency taken from the mixer.

3. A radar system according to claim 2 wherein the means for transferring the echo signal comprises:

(a) a local oscillator;

(b) a second mixer fed with the received signal and the output of the local oscillator for producing a signal of higher frequency;

(c) means for simultaneously transmitting the signal of higher frequency and the output of the local oscillator;

(d) means for receiving the signal of higher frequency and the output of the local oscillator; and (e) a third mixer fed with the signal of higher frequency and the output of the local oscillator for producing a lower frequency signal having the same frequency as the original received echo signal.

4. A radar system according to claim 3 which further comprises: a variable control oscillator having an output fed to the first mixer for correcting changes in the echo signal occurring during transfer.

References Cited

UNITED STATES PATENTS

| | | | |
|---|---|---|---|
| 3,256,520 | 6/1966 | Blitz | 343—14 |
| 3,262,112 | 7/1966 | Yost et al. | 343—14 |
| 3,299,427 | 1/1967 | Kondo. | |

RODNEY D. BENNETT, *Primary Examiner.*

J. P. MORRIS, *Assistant Examiner.*